US006785522B2

United States Patent
Ryu

(10) Patent No.: US 6,785,522 B2
(45) Date of Patent: Aug. 31, 2004

(54) METHOD FOR CHANGING TIMBRE DURING CONVERSATION IN CELLULAR PHONE

(75) Inventor: Byung-Seok Ryu, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 609 days.

(21) Appl. No.: 09/752,709

(22) Filed: Dec. 28, 2000

(65) Prior Publication Data

US 2001/0006901 A1 Jul. 5, 2001

(30) Foreign Application Priority Data

Dec. 30, 1999 (KR) .................................. 10-1999-0065748

(51) Int. Cl.⁷ ................................................. H04B 1/16
(52) U.S. Cl. .................... 455/200.1; 455/213; 455/219; 455/226
(58) Field of Search .............................. 455/553.1, 964, 455/9, 509, 511, 66.1, 67.7, 68, 701, 72, 76, 550.1, 570, 115, 156.1, 161.3, 219, 3.06, 200.1, 355, 213

(56) References Cited

U.S. PATENT DOCUMENTS

| | | | | |
|---|---|---|---|---|
| 5,550,893 A | * | 8/1996 | Heidari | 455/553.1 |
| 5,636,323 A | * | 6/1997 | Umemoto et al. | 704/226 |
| 6,011,853 A | * | 1/2000 | Koski et al. | 381/56 |
| 6,052,444 A | * | 4/2000 | Ferry et al. | 379/93.35 |
| 6,311,071 B1 | * | 10/2001 | Voroba et al. | 455/550.1 |
| 6,334,049 B1 | * | 12/2001 | Nishiyama et al. | 455/566 |
| 6,411,808 B1 | * | 6/2002 | Adachi et al. | 455/434 |
| 6,418,330 B1 | * | 7/2002 | Lee | 455/567 |
| 6,671,370 B1 | * | 12/2003 | Heinonen et al. | 379/373.02 |

* cited by examiner

Primary Examiner—Cong Van Tran
(74) Attorney, Agent, or Firm—Dilworth & Barrese, LLP

(57) ABSTRACT

The invention relates to a cellular phone terminal system, and in particular to a method for changing timbre of a voice signal during conversation in a cellular phone terminal system having a filter for filtering a PCM input signal. The method comprises the steps of: waiting for a timbre selector key input for a desired timbre when a timbre converter key is inputted during conversation; and setting a filter coefficient of the filter correspondingly to the timbre selector key input and filtering the PCM signal to change timbre.

8 Claims, 4 Drawing Sheets

METHOD FOR CHANGING TIMBRE DURING CONVERSATION IN CELLULAR PHONE

PRIORITY

This application claims priority to an application entitled "METHOD FOR CHANGING TIMBRE DURING CONVERSATION IN PORTABLE TELEPHONE" filed with the Korean Industrial Property Office on Dec. 30, 1999 and assigned Ser. No. 1999-65748, the contents of which is hereby incorporated by reference.

BACKGROUND OF THE INVENTION

1. Field of the Invention

The invention relates to a cellular telephone terminal, and in particular to a method for changing timbre of a voice signal during conversation in a cellular telephone terminal.

2. Description of the Related Art

In general, a vocoder of a cellular phone terminal has a filter, for example an FIR (Finite Impulse Response) filter, to improve timbre of voices which are transmitted and received during conversation. In other words, a filter coefficient of the FIR filter is suitably changed and the transmitted/received voices are accordingly equalized to improve the timbre.

However, the FIR filter provided in conventional cellular telephone terminals has been typically used only for improving the timbre during conversation, thereby degrading the efficiency of the source.

SUMMARY OF THE INVENTION

It is therefore an object of the invention to provide a method for changing timbre during conversation in a cellular telephone terminal.

To achieve the object of the invention, there is provided a method for changing timbre of a cellular telephone terminal having a filter for filtering a PCM input signal, said method comprising the steps of: waiting for a timbre selector key input for a desired timbre when a timbre converter key is inputted during conversation; and setting a filter coefficient of the filter correspondingly to the timbre selector key input and filtering the PCM signal to change timbre.

DETAILED DESCRIPTION OF THE PREFERRED EMBODIMENTS

Hereinafter, preferred embodiments of the invention will be described in detail in reference to the accompanying drawings. It should be understood that like reference numbers are used to indicate like elements even in different drawings. Detailed descriptions of known functions and configurations that may unnecessarily obscure the aspect of the invention have been omitted.

Figure 1:
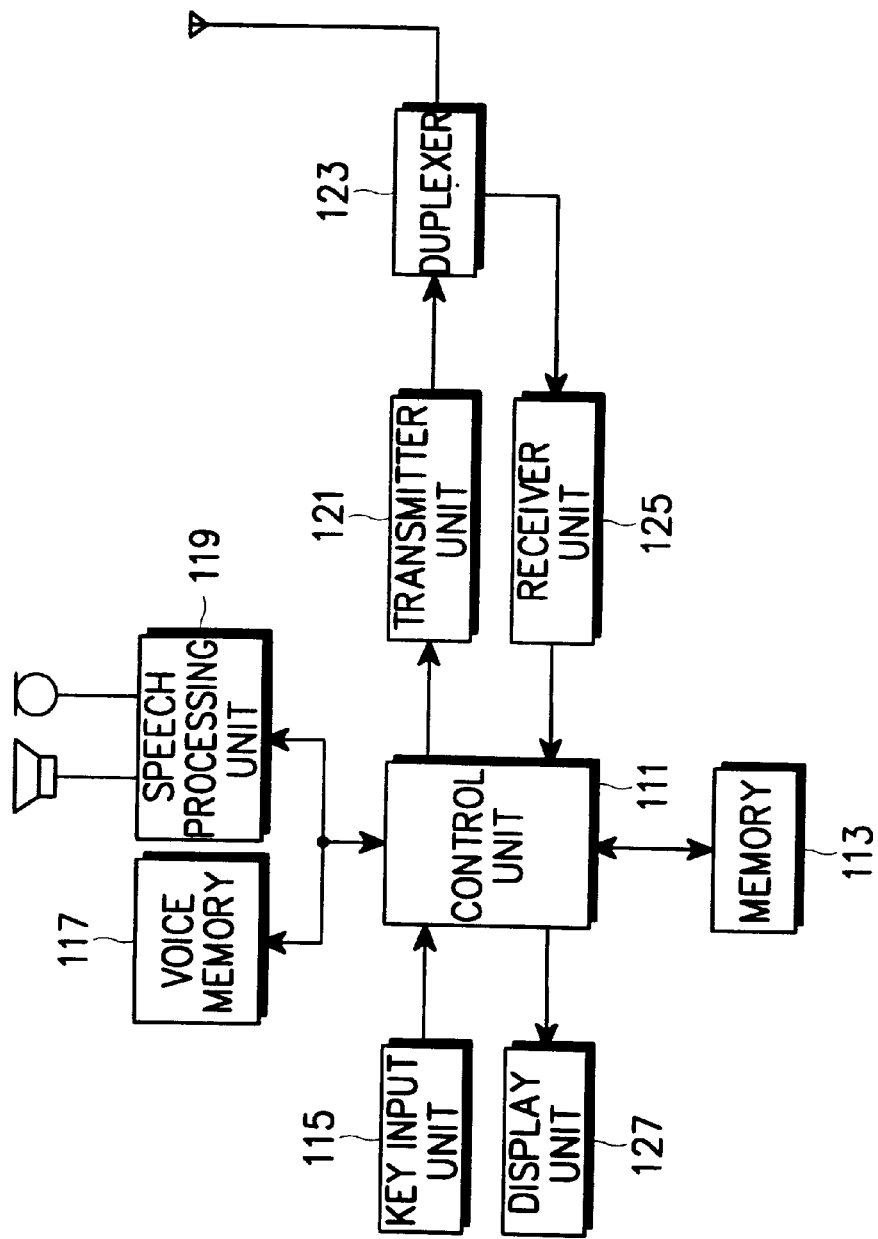
FIG. 1 is a block diagram showing the internal structure of a cellular telephone terminal for performing functions according to a preferred embodiment of the invention.

FIG. 1 is a block diagram showing the internal structure of a cellular telephone terminal for performing functions according to a preferred embodiment of the invention.

A control unit 111 controls the overall operation of the cellular telephone terminal. A memory 113 stores control programs of the cellular telephone terminal and controls data generated under the control of the control unit 111, and in particular filter coefficients of an FIR filter which are variously set according to each of timbres such as low, middle, high, middle low, middle high, original timbres, etc.

A key input unit 115 has a number of dialing digit keys, a menu key, a send key, etc, and generates key signals corresponding to selected keys by the user to send the same to the control unit 111.

A voice memory 117 stores a number of voice messages. When a voice message is read out from the voice memory 117 under the control of the control unit 111, a speech processing unit 119 processes the voice message into an analog signal and outputs the message via a speaker. Also, the speech processing unit 119 processes analog voices of the user inputted via a microphone into digital signals, and demodulates and outputs the received voice signals from a calling party or the called party to a telephone call.

A transmitter unit 121 receives the signals generated from the control unit 111 and modulates the same into digital signals to send to a duplexer 123. The duplexer 123 transmits the radio signals received from the transmitter unit 121 via an antenna, and sends signals received via the antenna to a receiver unit 125. The receiver unit 125 demodulates the radio signals received from the duplexer 123, and sends the demodulated signals to the control unit 111. The control unit 111 controls conversation in response to the received signals.

A display unit 127 is realized by LCD (Liquid Crystal Display), LED (Light Emitting Diode) or etc., and displays input data and control data from of the cellular telephone terminal which is processed under control of the control unit 111.

Figure 2:
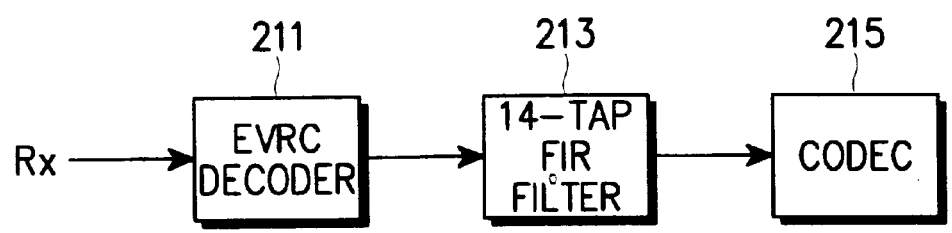
FIG. 2 is a block diagram for showing the internal structure of a speech processing unit shown in FIG. 1.

FIG. 2 is a block diagram for showing the internal structure of a speech processing unit shown in FIG. 1.

First, when a radio signal such as an EVRC (Enhanced Variable Rate CODEC) signal is received via the duplexer 123 from the counter part to the telephone call, the received signal is demodulated in the receiver unit 125 and into a voice in the speech processing unit 119 under control of the control unit 111. The voice control unit 119 is comprised of an EVRC decoder 211, a 14-tap FIR filter 213 and a CODEC 215.

The signal demodulated via the receiver unit 125 is inputted into the EVRC decoder 211, which processes an EVRC decoding on the demodulated signal and then outputs the decoded signal to the 14-tap FIR filter 213. The 14-tap FIR filter 213 receives and filters the signal from the EVRC decoder 211 to convert the same in PCM (Pulse Coded Modulation), and then sends the converted PCM signal to the CODEC 215 thereby outputting an analog-modulated voice.

Figure 3:
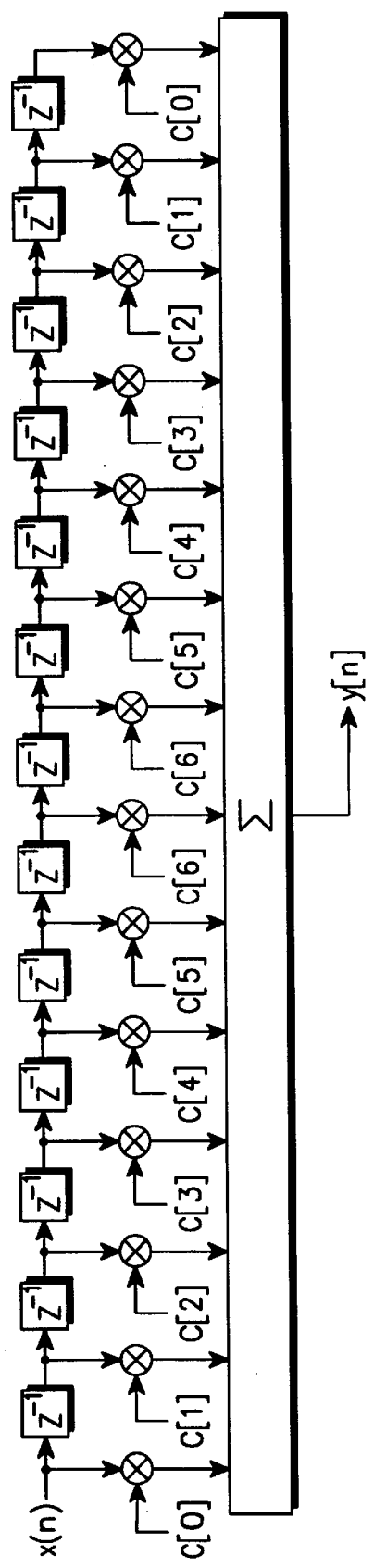
FIG. 3 is a diagrammatic view for showing the structure of a 14-tap FIR filter shown in FIG. 2.

FIG. 3 is a diagrammatic view showing the structure of the 14-tap FIR filter shown in FIG. 2.

The FIR filter used in FIG. 3 has a 14-tap structure, in which the filter coefficients are expressed in the following equation 1:

$$[Cn]=C[13-n]$$

Herein, [Cn] is a filter coefficient according to the number of the tap, and n is 0 to 13 in the 14-tap structure.

Also, x[n] indicates input data into the 14-tap FIR filter 213, and y[n] indicates output data from the 14-tap FIR filter 213 after filtered therefrom as shown in FIG. 3.

In this way, each of the filter coefficients corresponding to each of the low, middle, high, middle low, middle high and original timbres are set from the filter coefficients from [C1] to [C13] and stored in the memory 113. Here, a timbre selector key is designated together with the filter coefficients which correspond to each of the timbres respectively. For example, the voice selector key is designated "1" when the filter coefficient of the low voice is [C1], and the voice selector key is designated "2" when the filter coefficient of the middle timbre is [C3].

Figure 4:
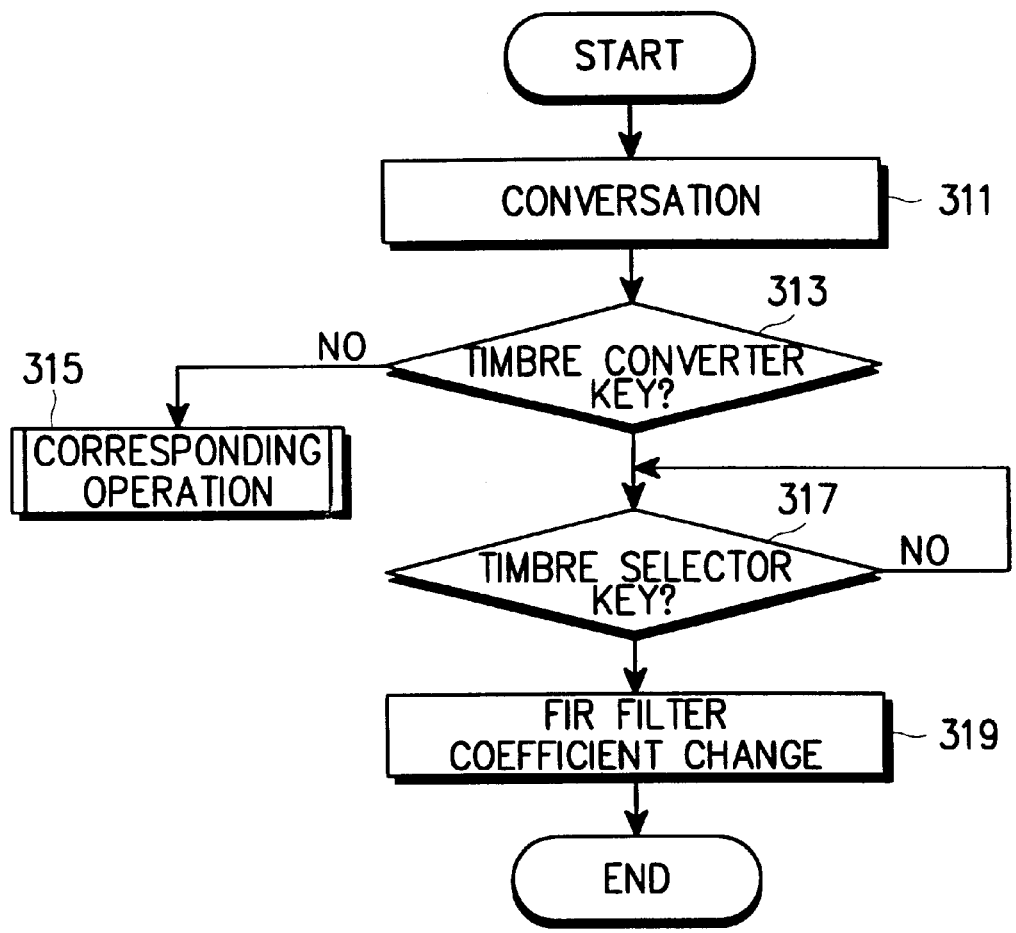
FIG. 4 is a flow chart for showing a timbre changing process according to a preferred embodiment of the invention.

FIG. 4 is a flow chart for showing a timbre changing process according to a preferred embodiment of the invention.

First, during an established telephone conversation, at step 311, the control unit 111 proceeds to step 313 when provided with a key signal from the key input unit 115 during processing of the conversation. In step 313, the control unit 111 determines if the key signal from the key input unit 115 is a timbre converter key signal. Here, the timbre converter key means a key which is set by combination of a number of keys provided in the key input unit 115, which is inputted to select a timbre which is desired for conversion of the voices transmitted and received during conversation.

When it is determined that the key signal is not the timbre converter signal, the control unit 111 proceeds to step 315. In the step 315, the control unit 111 performs an operation corresponding to the inputted key.

If it is determined that the key signal is the timbre converter key signal, the control unit proceeds to step 317. In the step 317, the control unit 111 determines if the timbre selector key signal is applied from the key input unit 115. Here, the timbre selector key means a key which is set by combination of the number of keys provided in the key input unit 115, which is inputted to select a timbre which is desired for voice conversion such as one of low, middle, high, middle low, middle high and original timbres corresponding to the input of the timbre convert key. If the timbre selector key signal is not provided during a previously set time period as a result of the inspection, the control unit 111 processes the step as an error.

The control unit 111 proceeds to step 319 if the timbre selector key signal has been provided. In step 319, the control unit 111 checks memory 113 to detect the filter coefficient corresponding to the provided timbre selector key signal, and changes the filter coefficient of the 14-tap FIR filter 213 to the detected filter coefficient, and the filter 213 then filters the PCM data inputted into the 14-tap FIR filter 213 with the changed filter coefficient to thereby process the conversation.

Although not shown, upon detecting the end of a conversation after changing the filter coefficient of the 14-tap FIR filter 213, the control unit 111 changes the filter coefficient of the 14-tap FIR filter 213 back to the same filter coefficient as the original voice processing filter coefficient.

As described hereinabove, the invention has the advantages of enabling a change and/or selection of the transmitted and/or received voice data timbres so that conversation voice timbres can be provided to satisfy the tastes of the cellular telephone terminal users.

While the invention has been described with reference to a detailed example of the preferred embodiment thereof, it is understood that variations and modifications thereof may be made without departing from the true spirit and scope of the invention. Therefore, it should be understood that the true spirit and the scope of the invention are not limited by the above embodiment, but defined by the appended claims and equivalents thereof.

What is claimed is:

1. A method for changing timbre of a cellular telephone terminal having a filter for filtering an input signal, said method comprising the steps of:

waiting for a timbre selector key input for a desired timbre when a timbre converter key is inputted during conversation; and setting a filter coefficient of the filter corresponding to the timbre selector key input and filtering the input signal to change timbre.

2. The method for changing timbre of a cellular telephone terminal in accordance with claim 1, further comprising the step of changing the filter coefficient back to an original value when the conversation ends.

3. The method for changing timbre of a cellular telephone terminal in accordance with claim 2, wherein the filter is an FIR filter.

4. The method for changing timbre of a cellular telephone terminal in accordance with claim 3, wherein the FIR filter has a 14-tap structure.

5. A method for changing timbre of a cellular telephone terminal having a filter for filtering a PCM input signal, said method comprising the steps of:

matching each of filter coefficients of the filter corresponding to each of a number of timbres to change the PCM signal into the number of timbres;

determining if a timbre converter key is inputted during conversation when conversation starts after said matching of the filter coefficients;

waiting for a timbre selector key input for a desired timbre when a timbre converter key is inputted;

detecting a filter coefficient set to the inputted timbre selector key;

controlling the filter to filter the PCM signal with the detected filter coefficient; and changing timbre.

6. The method for changing timbre of a cellular telephone terminal in accordance with claim 5, further comprising the step of changing the filter coefficient of the filter into a filter coefficient of an original timbre when the conversation ends.

7. The method for changing timbre of a cellular telephone terminal in accordance with claim 5, wherein the filter is an FIR filter.

8. The method for changing timbre of a cellular telephone terminal in accordance with claim 7, wherein the FIR filter has a 14-tap structure.

* * * * *